United States Patent [19]

Bradham, III

[11] 4,241,613
[45] Dec. 30, 1980

[54] MASS RATE FLOW METER

[75] Inventor: Allen C. Bradham, III, Milwaukee, Wis.

[73] Assignee: Badger Meter, Inc., Milwaukee, Wis.

[21] Appl. No.: 53,429

[22] Filed: Jun. 29, 1979

[51] Int. Cl.³ .............................................. G01F 1/78
[52] U.S. Cl. .................................. 73/861.71; 74/5.22
[58] Field of Search ............... 73/194 M, 229; 74/5.22

[56] References Cited

U.S. PATENT DOCUMENTS

| 2,222,754 | 11/1940 | Von Freydorf . | |
| 2,714,310 | 8/1955 | Jennings | 73/194 |
| 2,914,945 | 12/1959 | Cleveland . | |
| 2,964,954 | 12/1960 | Cleveland . | |
| 3,000,223 | 9/1961 | Trekell . | |
| 3,084,560 | 4/1963 | Cleveland . | |
| 3,396,579 | 8/1968 | Souriau | 73/194 |

*Primary Examiner*—Herbert Goldstein

*Attorney, Agent, or Firm*—Neuman, Williams, Anderson & Olson

[57] ABSTRACT

A mass rate flow meter is provided having a universally-mounted gyroscopic apparatus against which a fluid stream, the mass rate of flow of which is to be measured, is directed. The fluid drives the rotor of the gyroscopic apparatus at and angular velocity proportional to the fluid stream velocity and impinges upon a pressure pad mounted on the gyroscopic apparatus, such that the effective impingement force is applied asymmetrically to the rotor, thereby applying a torque to the gyroscopic apparatus proportional to the dynamic pressure of the fluid stream and causing precessional rotation of the gyroscopic apparatus. The resulting precessional rotation of the gyroscopic apparatus is at a rate proportional to the mass rate of flow of the fluid. Measurement of the precessional rotation of the gyroscopic apparatus provides an indication of the mass rate of flow, and totalization of the precessional rotations provides total mass flow indications.

17 Claims, 12 Drawing Figures

MASS RATE FLOW METER

The present invention relates generally to fluid flow measurement and, more specifically, to improved apparatus for accomplishing the measurement of mass of fluid flow. This invention is particularly advantageous in measuring the mass flow of gases or fluids of high gas content.

Mass measurement of fluid flow is extremely difficult because of the critical relationship between mass flow and the fluid density and viscosity, and because of the numerous factors causing variations in these characteristics. Nevertheless, accurate measurement of the mass flow of fluids is necessary as volumetric measurements can belie the exact amount of fluid flowing in a fluid stream. This is particularly true in the case of gases and fluids of high gas content.

Information concerning mass rate of flow of fluids can be derived in several known ways. Most commonly, devices coming under the general heading of rate meters or obstruction meters are placed in the fluid stream, such as orifices, flow nozzles, venturis, weirs, rotameters, ultrasonic meters and electromagnetic meters to measure the velocity of the flow stream. The velocity information is combined with known or inferred information as to the cross-section of the flow stream to determine volumetric flow rate. Mass flow may be readily inferred therefrom if the density of the fluid is either known, as in the instance of most liquids, or where a gas flow is under constant conditions, or where density of the flow stream is otherwise determined. However, if the density of the flow stream varies significantly, e.g., as in the cases of gaseous fluids under varying conditions of pressure and temperature, the volumetric flow rate obviously does not fully represent the mass of product flow. In such instances, some density or mass per unit volume determination must be added to obtain an accurate measurement or calculation of mass flow. In attempts to use those prior flow meter arrangements for measuring mass flow, utilizing known methods for securing some form of output signal responsive to the mass rate of fluid flow characteristic, the output signal often is erroneous because of its unresponsiveness to variations in fluid density and viscosity, whereupon appropriate modification of the signal by complex correction equipment has been required to afford a meaningful output. Further, external power sources often are necessary to operate the sensing, compensating or read-out equipment. Moreover, many such arrangements are primarily of laboratory or complex stationary installation types, and do not possess simplicity and ruggedness of construction, reliability of operation and accuracy of indication under all conditions which are required for general purpose applications.

It has been recognized that it would be desirable to measure mass flow directly with a flow meter which automatically compensates for density changes, and various such flow meters have been developed. For example, in one such type of flow meter, the fluid is caused to flow through a tortuous conduit, with some means being provided to sense the forces generated by the change(s) of flow direction as an indication of the mass flow. For example, the tortuous flow path (conduit) section may be rotated or oscillated such that a force is produced, by gyroscopic principles, from movement of the fluid, which force is related to the mass rate of flow of the fluid. In another type of mass flow meter, an impeller is placed in the fluid stream and rotated at a constant speed to accelerate the metered fluid to a predetermined angular velocity about the axis of impeller rotation, and a resiliently restrained reaction turbine in downstream relationship to the impeller is disposed such that the accelerated fluid impinges upon it and occasions measurable angular deflection related to mass rate of flow of the fluid. In general, however, none of the prior art flow meters for measuring mass flow directly have been sufficiently simple and independent of external power sources to gain widespread acceptance.

It is an object of this invention to provide improved mass rate flow meters.

A more particular object of this invention is to provide improved mass rate flow meters which automatically compensate for density change to yield output signals directly related to the mass rate of flow of the metered fluid, and which obviate the need for correction equipment.

It is another object of this invention to provide improved mass rate flow meters which yield output signals which are a linear function of the mass flow rate of the metered fluid and exhibit a zero reading for conditions of zero flow such that no special totalization equipment is required to sum mass flow units.

It is another object of this invention to provide improved mass rate flow meters which accomplish the aforesaid objects without necessitating the use of external power sources.

A further object of this invention is to provide improved mass rate flow meters which meet the aforesaid objects and which are economical to produce and are rugged and reliable in operation and easy to maintain.

Further and additional objects and advantages of this invention will appear from the description, the accompanying drawings and the appended claims.

In carrying out this invention in one embodiment, a mass rate flow meter is provided comprising a gyroscopic apparatus which is mounted within the flow path of a fluid stream, the mass rate of flow of which is to be measured, with freedom for movements of the gyroscopic apparatus about at least two mutually perpendicular support axes. The meter includes a rotor mounted for movements about a spin axis mutually orthogonal to the support axes, and a pressure pad disposed for the flowing fluid to impinge thereon and to apply an effective impingement force to the rotor structure asymmetrically of the spin axis. The flowing fluid imparts rotary velocity or spin to the rotor proportional to the velocity of the fluid. The momentum of the flowing fluid striking the pressure pad applies a torque about one of the support axes, causing precessional rotation of the gyroscopic apparatus about the other support axis. The precessional rotation is proportional to mass flow rate and is determined by appropriate read-out methods.

For a more complete understanding of this invention, reference should now be had to the embodiments illustrated in the accompanying drawings and described below by way of examples of the invention. In these drawings.

Figure 1:
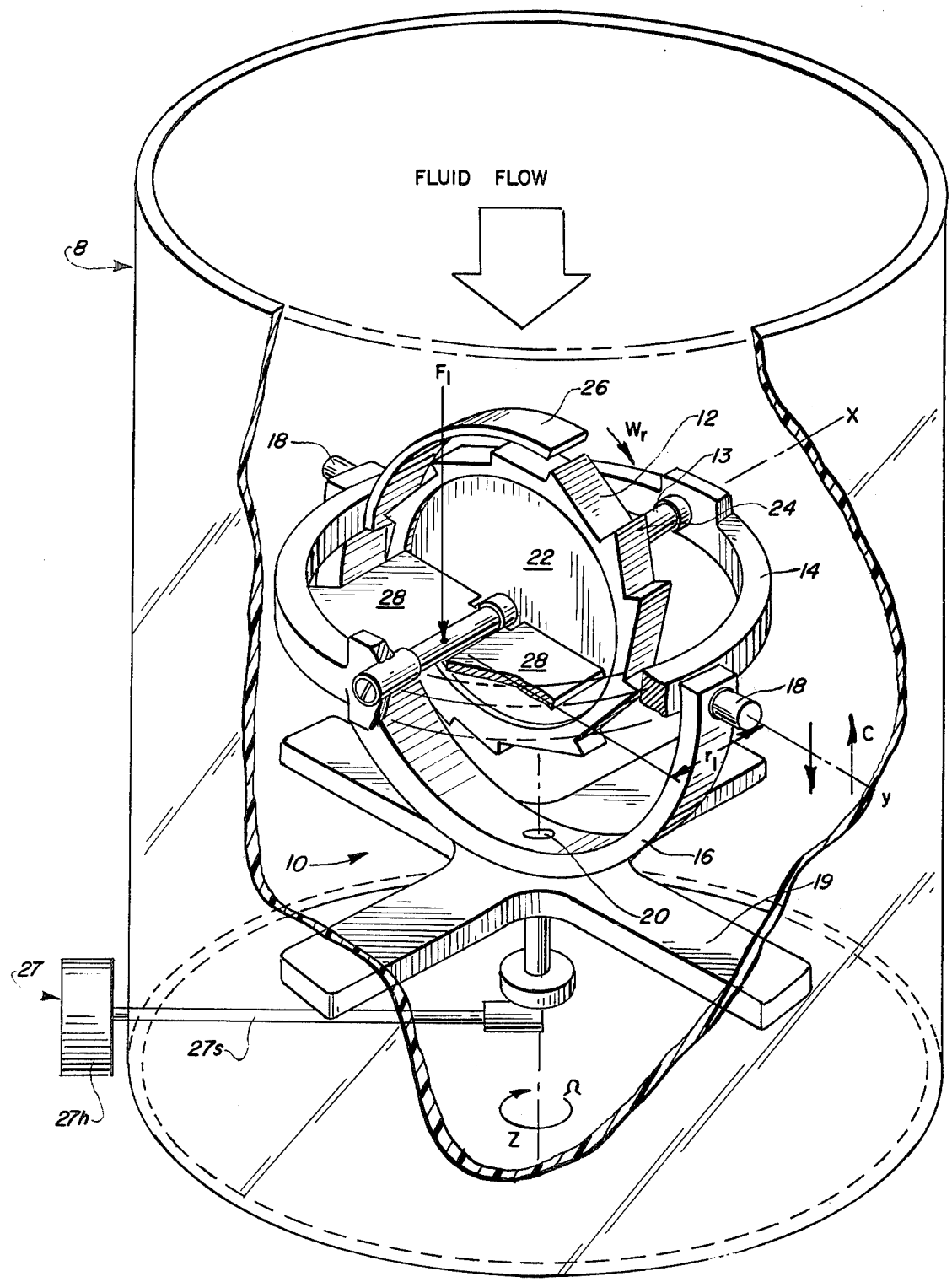
FIG. 1 is a perspective schematic view of a gyroscopic apparatus against which a fluid stream, the mass rate of flow of which is to be measured, is directed in accordance with teachings of the present invention.
Figure 2:
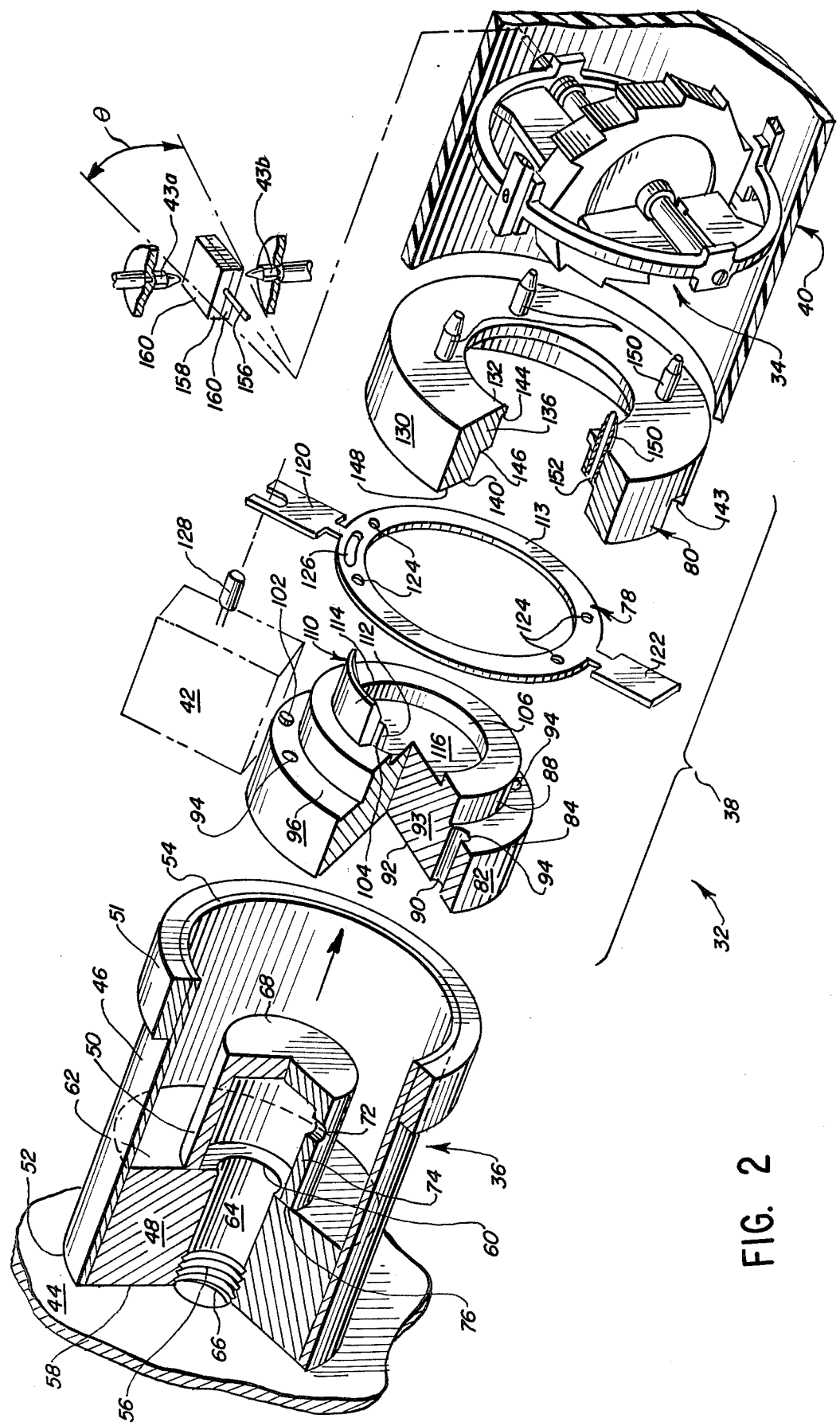
FIG. 2 illustrates, in an exploded, partly sectional and partly perspective view, one embodiment of a mass rate flow meter constructed in accordance with teachings of this invention, including a gyroscopic apparatus mounted for oscillatory precessional rotation.
Figure 5:
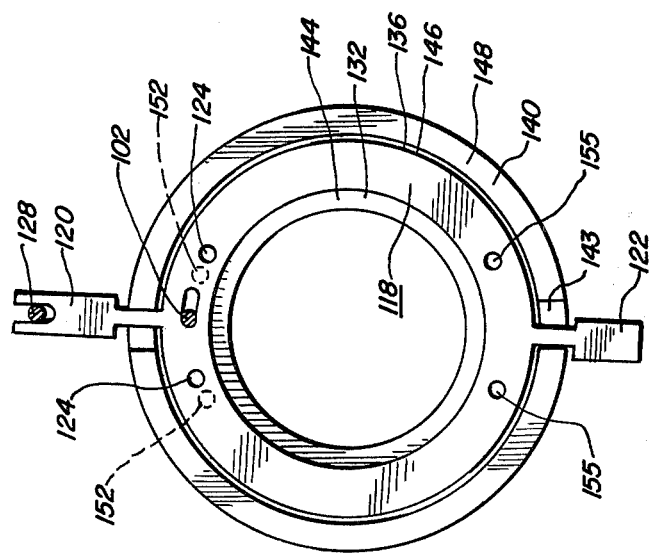
Figure 4:
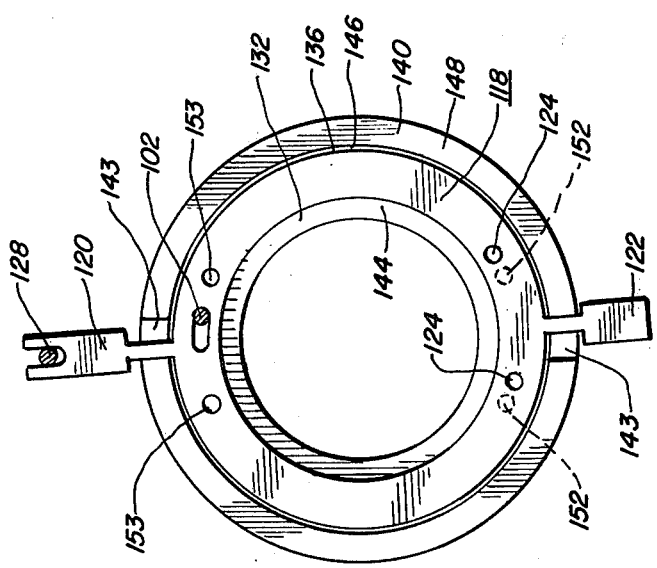
Figure 6:
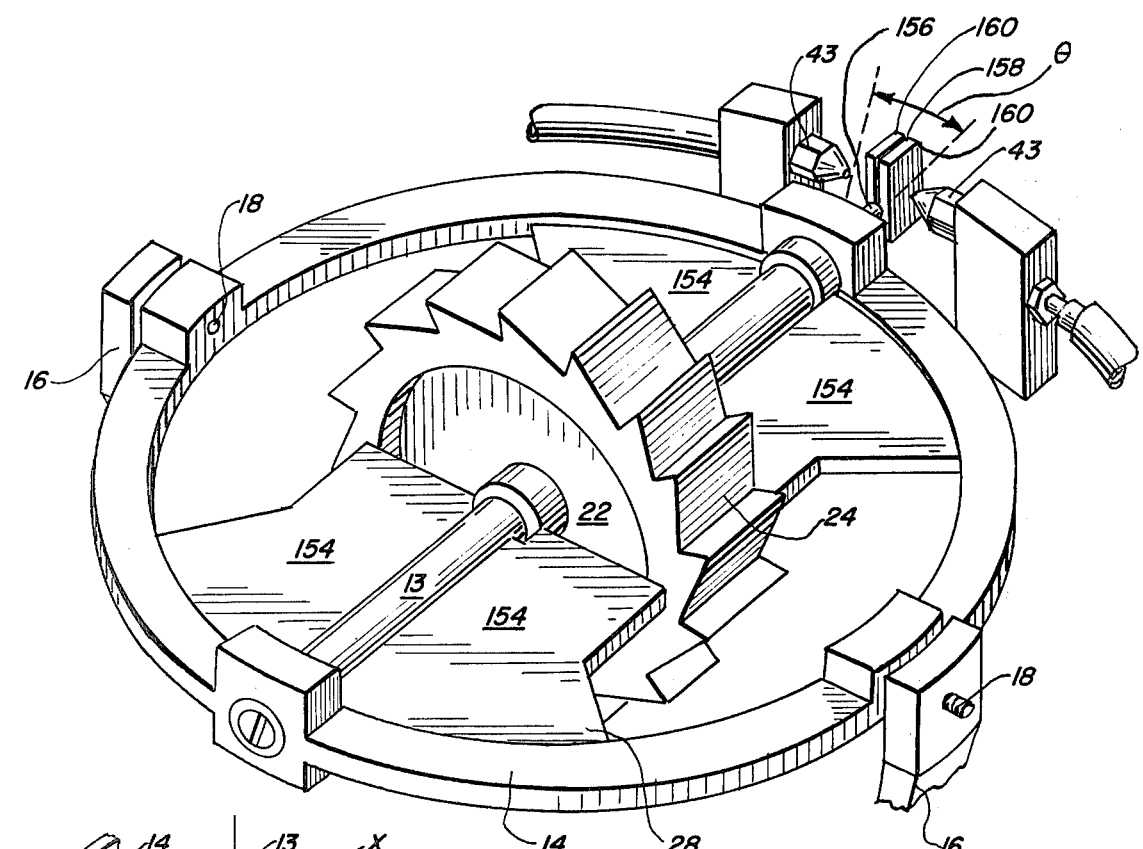
Figure 6A:
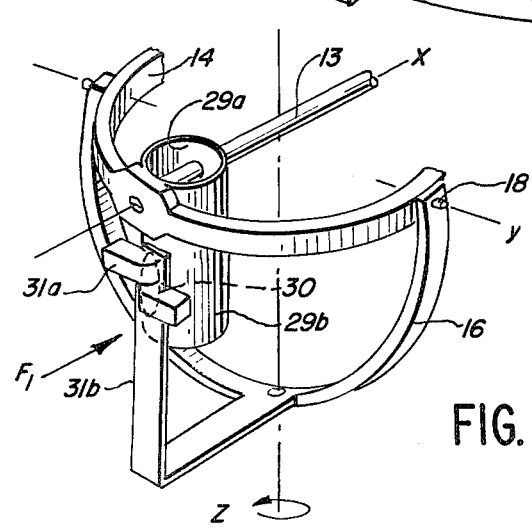
Figure 7:
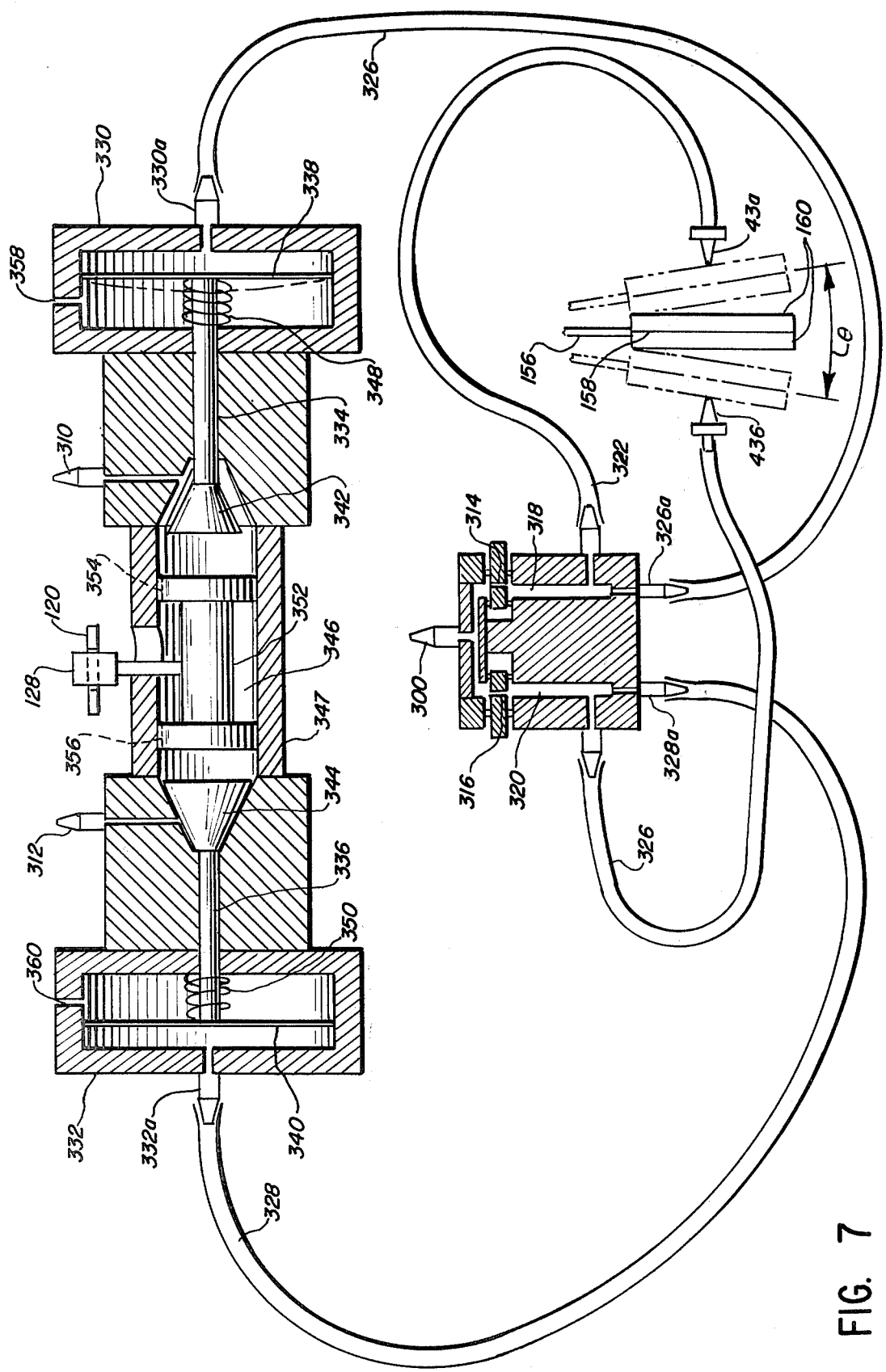
Figure 8:
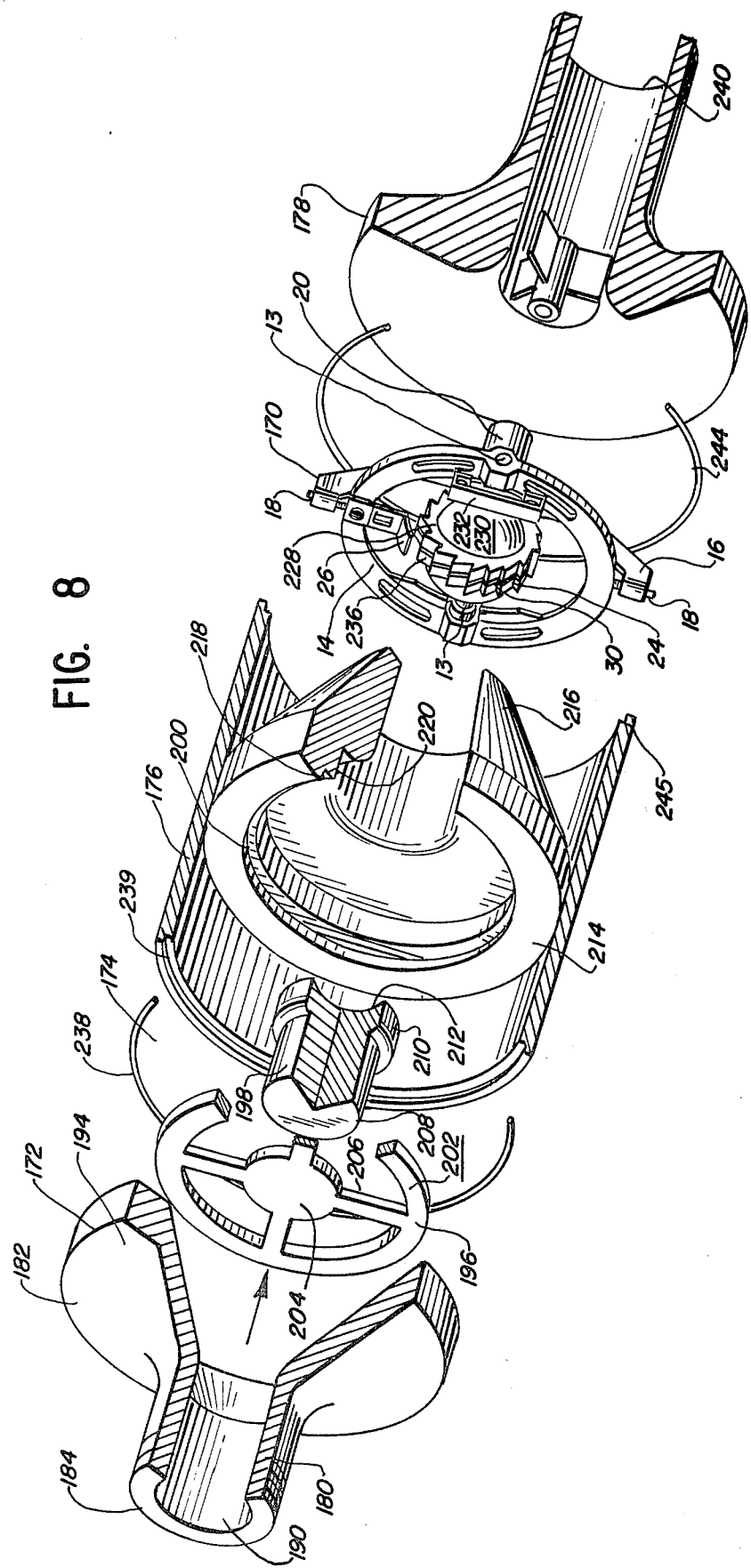
Figure 9:
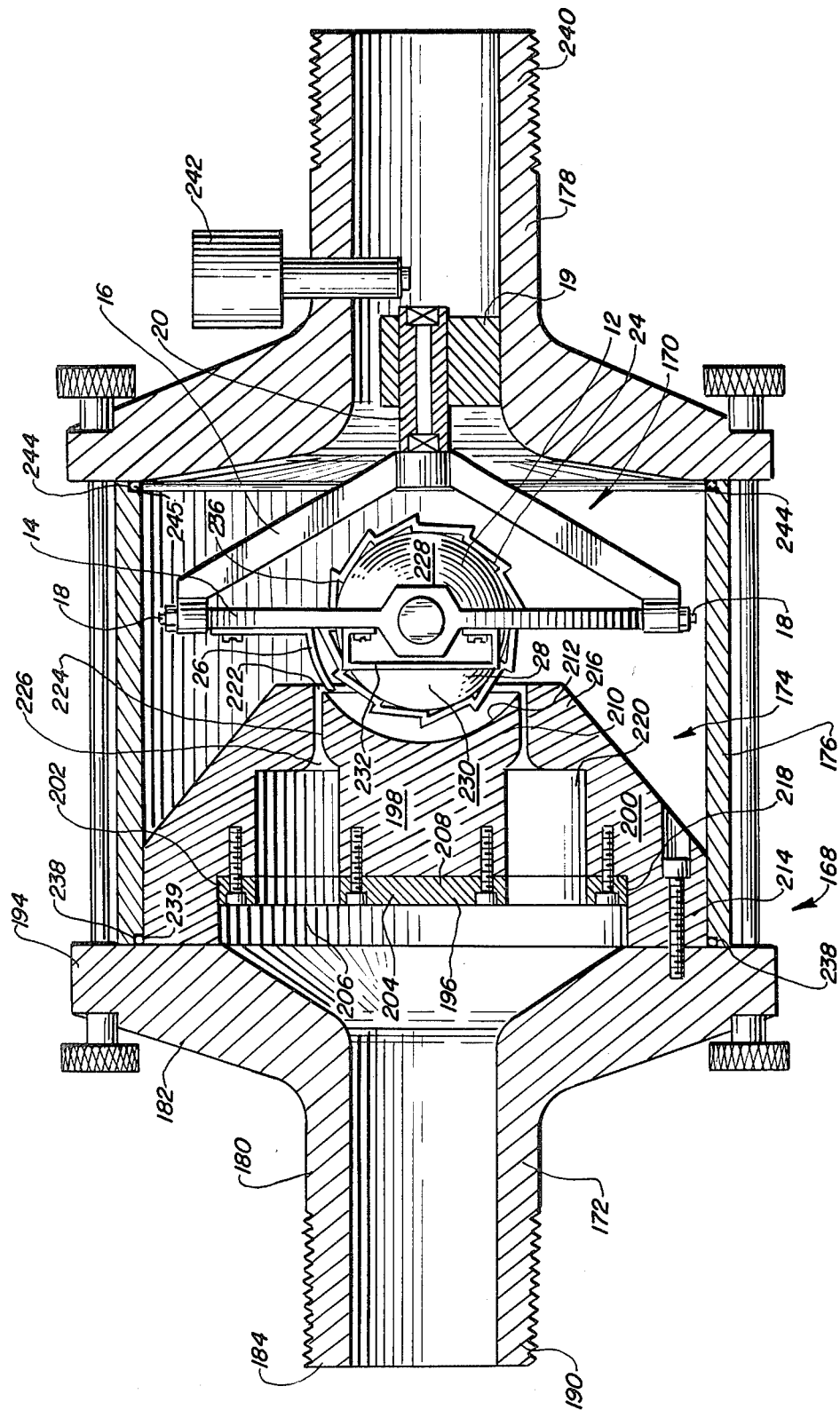
Figure 10:
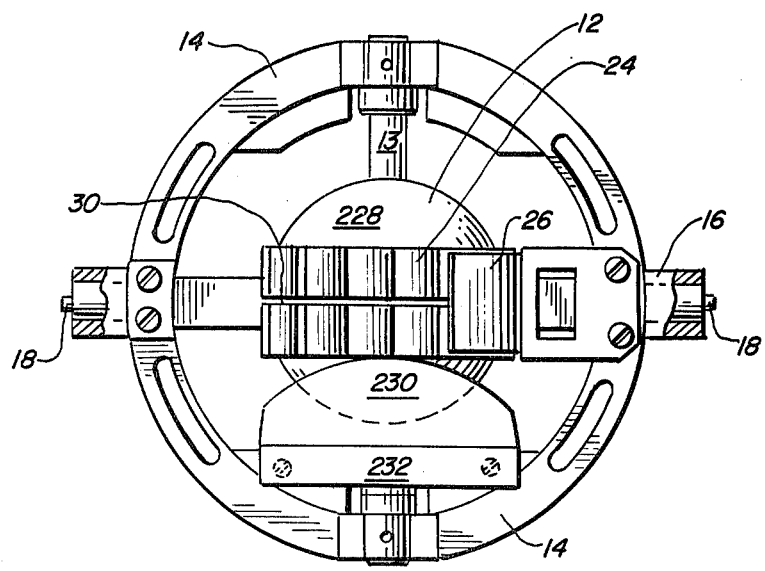
Figure 11:
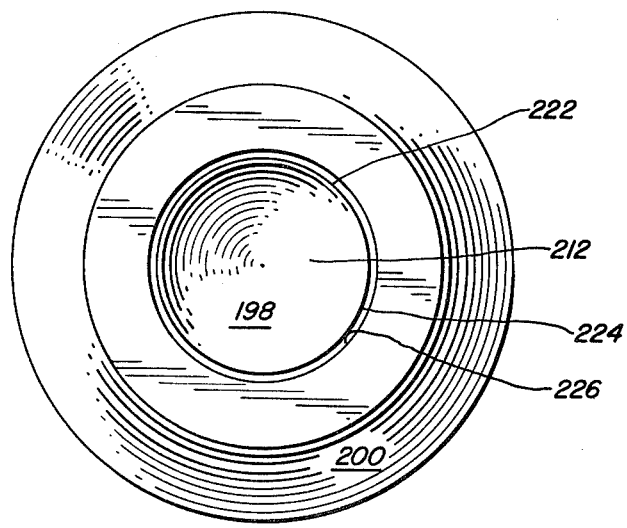

FIGS. 4 and 5 are slightly enlarged plan views of a jet valve and jet housing of FIG. 2, the jet valve being shown in FIG. 4 in a first extreme position relative to the jet housing whereat the orifices of a first pair of jets in the jet housing are exposed and the orifices of a second pair of jets in the jet housing are covered, and the jet valve being shown in FIG. 5 in a second extreme position whereat the orifices of the first pair of jets are covered and the orifices of the second pair of jets are exposed;

FIG. 6 is a slightly enlarged, perspective view of the gyroscopic apparatus and back-pressure outlets of FIG. 2, the length of the arc $\theta$ between the back-pressure outlets defining the limits of oscillatory precessional movement of the gyroscopic apparatus;

FIG. 6A is an enlarged schematic view of a compensating flow tube as one alternative arrangement for applying precessional force to the gyroscopic apparatus of FIG. 1;

FIG. 7 is a schematic of a fluidic amplifier control unit for the oscillatory meter of FIG. 2;

FIG. 8 illustrates, in an exploded partly sectional and partly perspective view, a presently preferred embodiment of a mass rate flow meter constructed in accordance with teachings of this invention, including a gyroscopic apparatus mounted for unidirectional precessional rotation;

FIG. 9 is a slightly enlarged, partly sectional view of the mass rate flow meter of FIG. 8, shown with an alternative nut and bolt assembly and a read-out mechanism;

FIG. 10 is a slightly enlarged plan view of the gyroscopic apparatus of FIG. 8 as seen from the right side of FIG. 8; and FIG. 11 is a slightly enlarged plan view of the cylindrical and frustoconical inserts of FIG. 8, illustrating an annular orifice formed by these inserts for directing the flow of the metered fluid against the gyroscopic apparatus.

Referring now to the drawings, FIG. 1 schematically illustrates a gyroscopic apparatus 10 used for measuring the mass rate of flow of a fluid through a conduit 8, in accordance with teachings of this invention. The gyroscopic apparatus 10 comprises a sensing rotor 12 journaled for rotation on an axle 13 in an annular ring 14 which is, in turn, supported for angular movement in a major gimbal 16 by minor axis trunions 18. A bearing (not shown) fixed upon a stationary support frame 19 mounted in the conduit passage provides support for angular movement of a major gimbal trunion 20 therein. The rotor 12 is thus afforded angular freedom about both a minor suspension axis y corresponding to the axis of trunions 18 and a major suspension axis z corresponding to the axis of trunion 20. The rotor spin axis x and both of the suspension axes are normally mutually perpendicular. The rotor 12 comprises an impeller 22 including vanes 24 about the circumference thereof. An arcuate shroud 26 extends from the annular ring 14 about a portion of the circumference of the impeller 22, covering the impeller 22 and thus the vanes 24 of the wheel in one upstream quadrant through an angle of approximately 90°. The gyroscopic apparatus 10 further comprises a pressure pad 28 affixed to the annular ring 14 at an asymmetrical position relative to the minor suspension axis y. The component may be counterbalanced as necessary for stability, such as by added weight to counterbalance the asymmetrically-located pad 28 and the shroud 26.

The gyroscopic apparatus 10 is shown in FIG. 1 disposed in the position required to meter the mass rate of flow of a fluid stream flowing downwardly through the conduit 8 about the gyroscopic apparatus as depicted by the large arrow at the top of FIG. 1. The moving fluid acts upon the vanes 24 causing the sensing rotor 12 to spin at an angular velocity $\omega_r$ proportional to the velocity of the fluid passing about the gyroscopic apparatus 10. An effective net force $F_1$ is developed by impact of the flowing fluid on the pressure pad 28. This force, acting on the x axis at an effective radius $r_1$ from the y suspension axis, creates a couple C tending to rotate the annular ring 14 and rotor 12 of the gyroscopic apparatus 10 about the y axis. As is known to those skilled in the art of gyroscopes, torques applied about a gyro minor axis, such as the y axis here, results in precession of the gyro about the major axis, i.e., about the z axis here, at an angular velocity $\Omega$. Little or no motion occurs about the y axis, because as precession occurs, an equal and opposite couple is created which resists the effect of force $F_1$. The precession of the gyroscopic apparatus 10 caused by force $F_1$ thus causes the major gimbal 16 and trunion 20 to turn at an angular velocity $\Omega$ on the bearing of the stationary outer frame 19.

As is more fully set forth hereinafter, the speed of rotation of the major gimbal 16 and trunion 20 has been found to be proportional to the mass flow rate. Accordingly, through any one of a variety of suitable transducer systems, the mass flow rate can be indicated from the rate of precessional rotation of the major gimbal 16 or trunion 20 and the total mass of fluid flowing through the meter over an interval of time can be determined by counting or totalizing this precessional motion.

One type of transducer system is illustrated schematically at 27, comprising a magnetic drive coupling 27m from trunion 20 to a register shaft 27s which is connected to a register head 27h. The head 27h may be a register or a further transducer to provide output signals to a remote computer or read-out device, not shown. Such magnetic coupling drives to registers are known in the fluid meter art, see e.g., U.S. Pat. No. 3,972,233.

The nature of a gyroscopic apparatus is that it must react in quadrature to any application of forces or torques. This requires that additional provision be made to permit development of any output torque on the major gimbal trunion 20. Referring to FIG. 1, the application of the force $F_1$ causes rotation of the major gimbal trunion in the direction indicated. If resistance to rotation of the major gimbal occurs, such as by the presence of bearing friction on the trunion 20, viscious friction or loading by a transducer output for indicating the rate and/or amount of precessional movement, a couple is developed in the xy plane which will cause the gyroscopic apparatus to precess in such a manner that the system will rotate about the y axis in the direction of the torque $F_1 r_1$. The result is an unloading of the force $F_1$ and a serious rolling of the spin axis such that no satisfactory output torque can be developed.

A further problem is that it is necessary that the rotor 12 remains in and turns symmetrically in the yz plane, and that the x axis remains horizontal. Because it is possible for the gyroscope to maintain any angle with the yz plane without tendency to "return to the vertical position" if not disturbed, it is required that some method be employed to cause the gyroscope to stabilize itself in the yz plane and provide forces which automatically maintain this orientation.

One design by which these problems can be solved is seen in FIG. 8. A groove or notch 30 is provided in the center of each of the vanes 24 on the rotor 12. Although the theoretical explanation is not fully understood, it has been discovered that the addition of such notches in the rotor vanes stabilizes the rotor. Thus, although there may be resistance to the rotation of the major gimbal trunion, with such notches its effect apparently is negated and the hereinafter assumption of negligible friction is appropriate.

As an alternative to the use of a pressure pad 28 to apply a momentum-derived force $F_1$ about the y axis, a flow tube may be used to generate a precessional couple force proportionate to the mass flow, as generally illustrated in FIG. 6A. For example, a flow tube 29 parallel to the z axis and which is open at the upstream end 29a and closed at the downstream end 29b and having a lateral discharge nozzle 30 in its side which is spaced from the y axis and opens in a direction parallel to the x axis, may be fitted on the axle 13 or to the annular ring of the minor gimbal 14 within an enlarged major gimbal. The change in momentum of the fluid in the xy plane as it exits from the discharge tube would result in a thrust, i.e., a precessional force $F_1$ (FIG. 6A), in a direction parallel to the x axis and spaced from the y axis, creating a couple about the y axis. To stabilize such a gyroscopic apparatus, a set of superposed deflector vanes or conduits 31a and 31b are supported on the major gimbal and positioned to normally be in register with the nozzle 30 for diverting the flow from the discharge tube in two separate opposed discharge paths normal to the xz plane. The deflector vanes will create equal and opposite forces acting at a common radius from the x and z axes as long as the gyroscopic apparatus remains in the "centered" position. When the gyroscopic apparatus moves out of the "centered" position, the nozzle 30 will move up or down relative to the two deflectors whereby a greater proportion of the discharge from nozzle 30 would be intercepted by one deflector vane than by the other. An imbalance in the amount of fluid diverted in each direction will result, thereby creating a difference in the forces in the respective directions about the z axis and, thus, a net correcting torque about the z axis.

Referring now particularly to FIGS. 2 through 7, one specific embodiment of a mass rate flow meter 32 according to this invention is shown. The meter 32 includes a gyroscopic apparatus 34 mounted for oscillatory precessional rotation at a rate directly and linearly proportional to the mass flow rate of fluid passing through a conduit in or on which the flow meter 32 is mounted. In addition to the gyroscopic apparatus 34, the flow meter 32 includes an inlet assembly 36, a jet assembly 38, an outlet assembly 40 and a fluidic amplifier control unit 42 having back-pressure outlets 43a and 43b.

Figure 3:
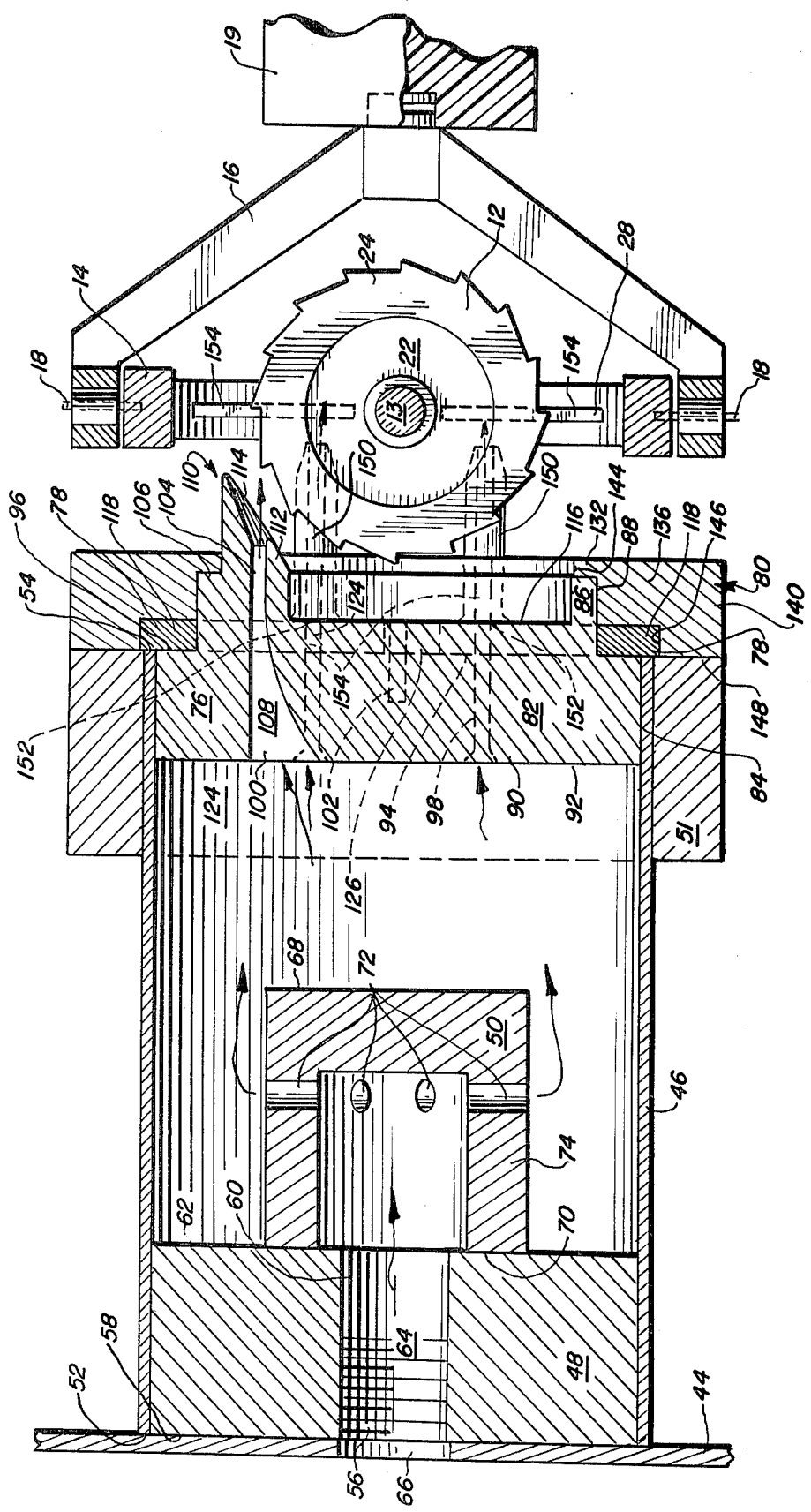
FIG. 3 is a slightly enlarged, partly sectional side view of the mass rate flow meter of FIG. 2.

Referring particularly to FIGS. 2 and 3, the inlet assembly 36 includes a mounting plate 44 for spanning a conduit, a hollow open-ended first cylinder 46, a plug 48, a second cylinder 50 and a collar 51. The plug 48 is inserted into one end 52 of the cylinder 46 and includes a threaded inlet port 56 in a face 58 thereof disposed externally of the cylinder 46, an outlet port 60 in a face 62 thereof disposed internally of the cylinder 46 and a passage 64 communicating the inlet port 56 with the outlet port 60. The cylinder 46 and plug 48 are mounted on the mounting plate 44 which has an opening 66 therethrough which is at least coextensive with the inlet port 56. The second cylinder 50 is hollow and includes one closed end 68 and an open second end 70 secured to the face 62 of the plug 48 about the outlet port 60. The second cylinder 50 further includes passages 72 (best seen in FIG. 3) in a side wall 74 thereof. The collar 51 is mounted concentrically about the outside of the other end 54 of the cylinder 46 and flush with the end 54.

The second cylinder 50 acts as a regulator, collecting the fluid which is to be metered and maintaining a more uniform velocity profile in the interior of the first cylindrical housing 46. In this manner, turbulence of the metered fluid is eliminated as well as problems of directed velocity. Moreover, the fluid flow into the interior of the first cylindrical housing is a uniform flow of a more homogeneous density with time. While this regulatory feature is not necessary to the performance of the apparatus, it contributes to a more accurate operation of the apparatus. Obviously, the system provides greatest accuracy under steady state conditions. While transient errors may occur during dynamic changes, such errors will tend to be mutually cancelling and average out, thereby being of little or no net effect as in many other dynamic reaction metering systems.

The jet assembly 38 includes a plug 76, a jet valve 78 and a jet housing 80. The plug 76 includes a solid first cylindrical body portion 82 defined by a first wall 84 and a solid second cylindrical body portion 86 defined by a second wall 88 of a lesser diameter. The first cylindrical body portion 82 of the plug 76 fits within the end 54 of the cylinder 46 such that the shoulder or seat 96 thereof is flush with the end 54 of the cylinder and the collar 51. Passages 98 are provided through the first cylindrical body portion 82, having inlet ports 90 disposed internally of cylinder 46 and outlet ports 94 disposed in the seat 96. A pin-limit stop 102 protrudes from the seat 96.

As seen in FIG. 3, the second cylindrical body portion 86 extends externally of the cylinder 46. A passage 108 (FIG. 3) extends through the first and second cylindrical body portion and provides communication between an inlet port 100 in the face 92 and outlet port 104 in the forward face 106. The inlet port 100 is of an area substantially greater than that of the outlet port 104, and the cross-sectional area of the passage 108 is successively reduced therebetween to form a throat, such that the velocity of fluid passing therethrough is increased. An arcuate baffle 100 is provided at the outlet port 104, which baffle is defined by inner and outer lips 112 and 114. The baffle 100 directs and concentrates the flow of the fluid toward the vanes 24 as its exists the outlet port 104. The second cylindrical body portion further includes a central recess or counterbore 116 in the forward face 106.

The jet valve 78 includes an annular ring 118 having first and second arms 120 and 122 extending radially therefrom. The annular ring 118 includes passages 124, for selective registration with ports 94, and an arcuate channel 126 therethrough. The annular ring is of an inner diameter to fit loosely over the second cylindrical body portion 86 of the plug 76, and is adapted to be concentrically positioned about the second cylindrical body portion of the plug, resting upon the surface formed by the seat 96, the end 54 of the cylinder 46 and the collar 51. The pin-limit stop 102 on the first cylindrical body portion extends into the channel 126 in the annular ring 118 when the jet valve 78 is positioned on the plug 76. The pin 102 and channel 126 cooperate to permit limited relative angular movement between the jet valve and the plug. In a first extreme position of the jet valve relative to the plug, as in FIG. 4, i.e., when the pin 102 has engaged one end of the channel 126, a first pair of the passages 124 in the jet valve and outlet ports 94 at one side of the assembly 38 will be aligned, and the passages 124 at the other side are out of registry with the respective parts. When the jet valve is in its second extreme position of FIG. 5, i.e., when the pin has engaged the other end of the channel 126 of the jet valve, the second pair of passages 124 in the jet valve will be aligned with the pair of outlet ports 94 at the other side of the assembly 38, and the first pair of passages and corresponding pair of outlet ports will no longer be in alignment.

The movement of the jet valve is controlled by a fluidic amplifier control unit 42, shown in FIG. 2 in block form. A pin 128 controlled by the fluidic amplifier control unit engages within a slot in arm 122 and reciprocates linearly between first and second positions to cause circumferential reciprocation of the jet valve between the aforementioned first and second positions. The fluidic amplifier control unit acts responsive to signals from sensing or back-pressure outlets 43. The operation of the fluidic amplifier control unit, back-pressure outlets 43 and pin 128 is depicted in the schematic drawing of FIG. 7 and each will be described more fully hereinafter.

Referring further to FIGS. 2 and 3, the jet housing 80 comprises an annular ring 130 including first, second and third body portions 132, 136 and 140 formed with first, second and third annular surfaces 144, 146 and 148, respectively. Radial openings 143 are provided within the third cylindrical body portion 140 to accommodate the arms 120 and 122 of the valve 118. The jet housing 80 further includes jet nozzles 150 each having an inlet orifice 152 in the second annular surface 146 and extending through the ring 130 in a parallel, coaxial direction away from the inlet assembly 36.

When the components are assembled as in FIG. 3, the jet housing 80 engages the collar 51. The baffle 110 of the plug 76 extends through the opening in the annular ring 130 of the jet housing 80. Moreover, the opening through the forward end of the annular ring 130 is at least coextensive with the recess 116 in the second cylindrical body portion 86. The annular ring 118 of the jet valve 78 fits within the third cylindrical body portion 140 of the jet housing 80 and is maintained between the body portion 82 of the plug 76 and the body portion 136 of the jet housing 80. The arms 120 and 122 of the jet valve 78 extend through the openings 143 as best seen in FIGS. 4 and 5. The openings 143 need not limit circumferential reciprocation of the jet valve 78, this function being accomplished as stated heretofore by interaction of the pin-limit stop 102 and channel 126. The orifices 152 of the jets 150 are in coaxial registry with the outlet ports 94 of the first cylindrical body portion 82. Movement of the jet valve 78, as described above, will thus be seen to provide selective communication between the outlet ports 94 and the orifices 152. Thus, when the jet valve is in the previously-defined first extreme position (FIG. 4), a first set of passages 153 is provided for the flow of fluid between the cylinder 46 and a pair of jet nozzles 150 in one side of the assembly. Similarly, when the jet valve is in the previously-defined second extreme position (FIG. 5), a second set of passages 155 is provided for the flow of fluid between the cylinder 46 and the pair of jet nozzles 150 in the other side of the assembly. The pairing of the jets is important, as will be more fully discussed hereinafter.

The gyroscopic apparatus 34 is similar to that disclosed in FIG. 1. Where appropriate, identical numbers are used to indicate the respective similar parts and, for purposes of expediency, the description of those similar parts is not reiterated here. Unlike the pressure pad 28 of the gyroscopic apparatus 10, the pressure pad of the gyroscopic apparatus 34 consists of four wings 154, one in each of the four quadrants defined by the impeller 22 and axle 13, as best seen in FIG. 6. Thus, the overall pressure pad is symmetrically mounted with respect to the support axes. Each of the four wings is located in front of one of the jet nozzles 150 of the jet housing 80 (FIGS. 2 and 3). The gyroscopic apparatus is allowed a predetermined degree of oscillatory precessional rotation about the y support axis, defined by the arc $\theta$, between the back-pressure outlets 43 of the fluidic amplifier control unit 42 (FIGS. 2 and 6), as more fully explained hereinafter. During operation of the apparatus, as a result of the operation of the jet valve, only two of the four jets 150 of the jet housing 80, which are located on the same side of the wheel, i.e., on the same side of the y-z plane, are discharging fluid toward their respective pressure pad wings 154 at any given time. Accordingly, a torque is continually being applied about a support axis y of the gyroscopic apparatus thereby causing precession of the gyroscopic apparatus about the other support axis z. However, the torque and hence, the direction of precession are reversed automatically at each end of the arc $\theta$.

To effect the aforementioned reversal, by actuation of the valve 78, a rod 156 is mounted on the annular ring 14 of the gyroscopic apparatus 34 and has mounted on the end thereof a plate 158 sandwiched between two pads 160 (FIGS. 2, 6 and 7). The plate and pad arrangement oscillates between the back-pressure outlets 43. When the plate and pad arrangements abuts against one of the back-pressure outlets, a fluidic signal is sent to the fluidic amplifier control unit 42 whereby the pin 128 is moved linearly thereby causing circumferential movement of the jet valve 78. The pair of jets 150 then operating is shut down and the other pair of jets is caused to discharge fluid toward their respective pressure pad wings. The gyroscopic apparatus thereupon precessionally rotates in the opposite direction toward the other back-pressure outlet.

Because of the permitted excursion of the pressure pad wings of the gyroscopic apparatus 34, the fluid which is intended to impinge upon the wheel 22 must be directed against only the vanes 24 of the wheel. It is to this end that the baffle 110 is provided. The arcuate shape of the port 104 and of the baffle directs the fluid such that it impinges directly upon the vanes (and only the vanes) over the entire breadth of the gyroscopic apparatus' oscillation. The relationship of the baffle and wheel is best seen in FIG. 3. It will be seen that the recess 116 provided in the second cylindrical body portion 86 enables appropriate positioning of the wheel 22 in alignment with the port 104. Moreover, such positioning of the gyroscopic apparatus in front of the jet assembly provides for registry of the jets 150 with the wings 154.

The outlet housing 162 of the outlet assembly 40 collects the metered fluid and is of any appropriate configuration to be joined with an outlet conduit as would be well known to one skilled in the art and, therefore, not shown in detail herein. The outlet assembly includes in a side wall 164 thereof a fluid impermeable, flexible membrane 166 through which the rod 156 extends. The flexible membrane 166 allows oscillatory movement of the rod 156 relative to the housing 162 while maintaining the fluid-tight integrity of the system.

The amplifier control unit 42 may be of any suitable design and mode of operation. A fluidic logic system operated by fluid pressure taps from the system being metered is preferred to avoid external power requirements and thereby to maintain a fully self-contained and operated metering unit. The control unit illustrated schematically in FIG. 7 meets these parameters. Inlets 300, 310 and 312 receive fluid under pressure from the main system through suitable tubing connections (not shown). Inlet 300 communicates through choke orifices 314 and 316 with two manifold passages 318 and 320 to which are connected tubes 322 and 324 communicating with the back-pressure outlets 43a and 43b. Tubes 326 and 328 communicate with signal outlets 326a and 328a of the manifolds and with signal inlets 330a and 332a of two pressure diaphragm operator units 330 and 332. Connecting rod assemblies 334 and 336 connect the respective diaphragms 338 and 340 to conical valve pistons or diffusers 342 and 344 which control the pressure connections between the inlets 310, 312 and with the respective ends of a piston chamber 346 in a cylinder 347. Compression springs 348 and 350 bias these valves to their closed positions. A reciprocable free piston 352 in the chamber 346 carries and drives the pin 128 for positioning the jet valve 78 as described above. A small exhaust port is provided from each end of the chamber 346, as by providing a small notch in the respective sliding seal of piston 352 as indicated at 354 and 356. Exhaust ports are provided for the diaphragm units, as at 358 and 360.

In the operation of the logic unit of FIG. 7, the pressure supplied to each manifold 318 and 320 escapes through the respective outlet nozzle 43a or 43b, and valves 342 and 344 are closed, until the plate and pad 158, 160 engages one of the back-pressure outlets 43. At the moment of contact, flow from the contacted back pressure outlet 43a and 43b is decreased because of blockage. This causes the internal pressure in the respective back-pressure outlet circuit to increase to a value near to that available at the main pressure inlet 300 which is substantially greater than that of atmospheric pressure. This pressure signal is transmitted through the respective connecting tubing 322 and 324 to the pressure signal outlet 326a or 328a and hence to the diaphragm unit 330 or 332. This pressure signal can be transmitted only by the pressure signal outlet which is blocked, due to the choke orifice bypass valves 314 and 316. This pressure signal causes a deflection of the respective pressure diaphragm 338 or 340 due to the difference in pressure from the pressure signal inlet 330a or 332a to the atmospheric pressure relief tap 358 or 360. The deflection of the pressure diaphragm moves the respective deflection rod assembly 334 or 336 and thereby opens the respective high pressure inlet port 310 or 312. This establishes a pressure differential from the pressure inlet port to the atmospheric pressure at the opening for the pin 128 on the respective face of the movable piston 346. The pressure of this differential pressure generates a force sufficient to move the piston 346 along the piston barrel 346 and hence linearly moves the pin 128. When the plate and pad arrangement ceases to block the back-pressure outlet, the pressure on the respective pressure diaphragm is released and the respective return spring 350 seats the respective valve 342 or 344 thereby once again blocking the respective pressure inlet port. With the high pressure port blocked, the unbalanced pressure on the piston face is allowed to dissipate through the respective orifice 354 or 356. However, the piston 346 remains in its displaced position until the opposite pressure diaphragm is deflected.

The use and operation of the embodiment of the mass rate flow meter of this invention depicted in FIGS. 2 through 7, is believed to be apparent from the foregoing, but will be summarized. The mass rate flow meter 32 is inserted into a line through which the fluid which is to be measured is flowing. The fluid enters the inlet assembly port 56 passing through the passage 64 and out the outlet port 60 into the cylindrical housing 50. The fluid emerges at a controlled rate from the cylinder 50 through the passages 72 into the interior of the cylinder 46. The fluid exits the cylinder 46 through the passage 108 and is directed by the baffle 110 to impinge upon the vanes 24 of the wheel 22 of the gyroscopic apparatus 34. The wheel is caused to rotate at a speed proportional to the velocity of the flowing fluid. The fluid also selectively exits through the jets 150 to impinge upon the wings 154 of the pressure pad of the gyroscopic apparatus 34. Initially, a first pair of jets on one side of the plane defined by the wheel 22 are open and the other pair of jets on the other side of the plane defined by the wheel 22 are closed. In this manner, a torque proportional to the momentum of the flowing fluid is applied upon the annular ring 14 about the minor gimbal trunion 18 in a first direction. By gyroscopic principles, the gyroscopic apparatus precessionally rotates until the plate and pad arrangement 158 and 160 engages one of the back-pressure outlets 43, e.g., nozzle 43a. A signal is thereby sent to the fluidic amplifier control unit 42. The fluidic amplifier control unit responds as previously described and linearly moves the pin 128, thereby causing circumferential movement of the jet valve 78. Such movement of the jet valve shuts off the flow of air through the first pair of jets and opens the flow of air through the second pair of jets. A torque is thus applied to the annular ring 14 about the minor gimbal trunion in a second, reverse direction, thereby causing precessional rotation of the gyroscopic apparatus about the major gimbal trunion in an opposite direction. The gyroscopic apparatus precessionally rotates in the opposite direction until the plate and pad arrangement engages the other back-pressure outlet 43b, at which point an opposite signal is sent to the fluidic amplifier control unit and the pin 128 is shifted linearly in the reverse direction. This causes the jet valve 78 to be moved circumferentially in the reverse direction, closing the second jets and opening the first pair of jets and causing the gyroscopic apparatus to again precess in the first direction, whereupon the cycle is repeated. This controlled reversal or reciprocation continues throughout the operation of the meter of FIGS. 2–7. The fluid discharged by the jets and the baffle is collected by the housing 162 of the outlet assembly 40 for redelivery to the line in which the mass rate flow meter has been inserted. The oscillatory movements of the gyroscopic apparatus can be counted or otherwise monitored by any one of a variety of methods such as electrical, fluidic or photoelectric sensing and/or registering devices which are well known to those skilled in the sensing metering and measuring arts and, therefore, are not described further herein. The rate of occurrence of the reversals is a direct indication of the mass rate of fluid flow, and the summation is a measure of the total mass flow for the period of the summing.

The constant sequential reversing of the precessional torque force and the concomitant reversing of the direction of application of any frictional or drag forces avoid or overcome extraneous precessional movement that may arise from such forces. For example, if the impeller begins to precess about the y axis because of friction or read-out transducer forces while the apparatus is precessing about the z axis in one direction, any such movement about the y axis will be reversed during the next oscillation reversal about the z axis.

Referring now to FIGS. 8 through 11, a second and presently preferred embodiment of a mass flow meter 168 according to this invention is shown. A gyroscopic apparatus 170 is mounted for unidirectional precessional rotation at a rate directly and linearly proportional to the mass flow rate of fluid passing through the flow meter 168. In addition, the flow meter 168 includes an inlet housing 172, a jet assembly 174, an intermediate housing 176 and an outlet housing 178.

The inlet housing 172 includes a cylindrical portion 180 and a transitional frustoconical portion 182. The cylinder 180 is hollow and forms open end 184. The end 184 comprises a threaded inlet port 190 (threaded either internally, FIG. 8, or externally, FIG. 9) for connection to a suitably threaded conduit. The frustoconical portion 182 also is hollow and forms the outwardly flaring open inner end 194.

The jet assembly 174 includes a web plate 196, a generally cylindrically-shaped insert 198 and a generally frustoconical insert 200. The web plate 196 includes an annular ring 202, a circular central portion 204, and radial arms 206 extending between the annular ring 202 and the central portion 204. The generally cylindrically-shaped insert 198 is solid, having one flat end 208 and a second end portion 210 which is recessed in a concave manner to define a dished surface 212. The flat end 208 of the insert 198 is affixed to the central portion 204 of the web plate 196 by any suitable means, e.g., by cementing (FIG. 8) or bolting (FIG. 9).

The generally frustoconically-shaped insert 200 is hollow and open at both ends 214 and 216. An annular recess 218 is provided in the interior wall 220 immediately adjacent the end 214 to receive the web plate 196 against the resulting inner annular shoulder. The web plate is mounted within the recess by any suitable means, e.g., by cementing (FIG. 8) or bolting (FIG. 9). The outer diameter of the end portion 210 of insert 198 is slightly less than the inner diameter of the end portion 216 of the insert 200. When the web plate and insert 198 are mounted in insert 200, the end portion 210 extends into the portion 216, and the ends 210 and 216 define a narrow annular nozzle aperture 222 (see FIGS. 9 and 11). The end portions 210 and 216 include inner annular surfaces 224 and 226 (FIGS. 8 and 9) of appropriate configuration to form the annular nozzle 222, thereby concentrating and directing the fluid jet discharged therethrough.

The gyroscopic apparatus 170 (FIG. 10) is also similar to that disclosed in FIG. 1. Accordingly, where appropriate, as with the first embodiment, identical numbers are used to indicate the respective similar parts and, for purposes of expediency, the description of those similar parts is not reiterated here. The sensing rotor 12 comprises a sphere 228 including vanes 24 about the circumference thereof. The spherical shape assures good distribution of the gas flow about the rotating body. A groove or notch 30 is provided in the center of the vanes 24 to stabilize the gyroscopic apparatus, as set forth hereinbefore. Unlike the pressure pad 28 of the gyroscopic apparatus 10, the pressure pad of the gyroscopic apparatus 170 consists of a spherically-shaped deflection tongue 230 which cups the sphere without touching it, and a mounting tab 232, asymmetrically mounted with respect to the y support axis on the annular ring 14.

The gyroscopic apparatus 170 is allowed complete rotational freedom about the z support axis. Accordingly, the construction of the jet assembly 174 and gyroscopic apparatus 170 is such that fluid is continually directed against the vanes 24 and the pressure pad 28 for all positions of revolution of the apparatus 170. It is to this end that the annular jet 222 is provided. Fluid exiting the annular jet will concomitantly impinge upon the vanes 24 of the sphere 228 and the deflection tongue 230 of the pressure pad for all such positions. A guard or shroud 26 is mounted on the annular ring 14 to shield the leeward sides 236 of the vanes 24 from impingement by the fluid being discharged from the annular jet.

The intermediate housing 176 encases the jet assembly 174 and the gyroscopic apparatus 170. This housing is held in abutting relation to the inlet housing 172 by cementing (FIG. 8) or a bolting arrangement (FIG. 9). An "O"-ring 238 is inserted in a recess 239 provided in the intermediate housing to provide a seal between these housings.

The outlet housing 178 confines the metered fluid and is threaded or otherwise adapted, as is housing 172, for attachment of an outlet pipe to the outlet port 240. The outlet housing 178 is held in abutting relation to the intermediate housing 176 by cementing (FIG. 8) or a bolting arrangement (FIG. 9). An "O"-ring 244 is inserted in a recess 245 to provide a seal at this joint. A read-out mechanism 242 (FIG. 9) is mounted on the outlet housing. This mechanism is coupled to the gyroscope major gimbal trunion 20 to provide an indication of the rate of precessional rotation and/or to totalize the number of precessional rotations. The coupling can be accomplished magnetically as illustrated in FIG. 9 or mechanically, or photoelectrically, or by any suitable technique known in the art and, therefore, is not shown in detail herein.

In use and operation, the mass rate flow meter 168 of FIGS. 8-11 is inserted into a line through which the fluid which is to be measured is flowing by suitable connection to the housings 172 and 178. The fluid enters the inlet housing 172 and passes into the jet assembly 174, through the web plate 196 and emerges as a uniform annular jet from the annular nozzle 222. This jet impinges upon the vanes 24 of the sphere 228 and the deflection tongue 230 of the pressure pad. In this manner, the sphere is caused to rotate at a speed proportional to the velocity of the flowing fluid and a torque proportional to the momentum of the flowing fluid is applied upon the annular ring 14 about the minor gimbal trunion 18. By gyroscopic principles, the gyroscopic apparatus precessionally rotates about the major gimbal trunion at a rate proportional to the mass rate of flow of the fluid. The rotational movement of the gyroscopic apparatus is monitored by the mechanism 242, or in any of a variety of methods in the art, and serves as a direct measurement of the mass rate of flow of fluid through the meter.

The details of the theory and reasons for useful and satisfactory operation of the subject invention are not now fully known or appreciated. Certain particular problems or parameters and solutions thereto are discussed above. However, the following is an example of a possible basic theoretical outline currently believed to be applicable to the overall operation of the aforedescribed invention and may be helpful to understanding, using and practicing the invention and in developing further embodiments of the basic invention.

For a flow meter detector unit such as those disclosed herein, it is hereinbefore stated that, essentially $$M_f = K\Omega \tag{1}$$

where,
$M_f$ = mass rate of flow,
$\Omega$ = angular velocity of the major gimbal trunion, and
$K$ = constant related to the design of the system and the conduit in which installed.

In the following paragraphs, the derivation of this relationship will be shown.

The fundamental equation for the motion of a gyroscope is:

$$T = I\omega\Omega \tag{2}$$

where,
$T$ = impressed torque constituting the precession couple as defined above,
$I$ = moment of inertia of the rotating parts,
$\omega$ = angular velocity of the rotor, and
$\Omega$ = angular velocity of precession.

The impressed torque also may be expressed as $$T = P A_p r_p \tag{3}$$

where, $$P = (\gamma/2g)V_j^2 \tag{4}$$

and,
$\gamma$ = specific weight of the fluid
$P$ = dynamic pressure of the fluid impinging on the pressure pad
$g$ = gravitational constant,
$V_j$ = fluid velocity before impacting the pressure pad,
$A_p$ = effective area of the pressure pad, and
$r_p$ = effective radius at which the fluid impact force acts on the pressure pad.

Therefore, $$T = (\gamma/2g)V_j^2 A_p r_p \tag{5}$$

Also, $$\omega = V_n/r_r \tag{6}$$

where,
$V_n$ = fluid velocity at the nozzle
$r_r$ = effective radius of the rotor Substituting in equation (2), $$(\gamma/2g)V_j^2 A_p r_p = I(V_n/r_r)\Omega \tag{7}$$

Assuming that $V_j$ is approximately and effectively equal to $V_n$, then equation (7) reduces to $$(\gamma/2g)V_j A_p r_p = (1/r_r)I\Omega \tag{8}$$

which may be regrouped as $$(\gamma/2g)V_j A_p = (1/r_p r_r)I\Omega \tag{9}$$

Further, assuming that the cross sectional area of the jet ($A_j$) effectively equals the effective area of the pressure pad ($A_p$), equation (9) becomes:

$$(\gamma/2g)V_j A_j = (1/r_p r_r)I\Omega \tag{10}$$

However, $$M_{fj} = \rho V_j A_j = (\gamma/g)V_j A_j \tag{11}$$

where,
$M_{fj}$ = mass flow rate through the jet, and
$\rho$ = density of the fluid.

Grouping constants, $$K = 2I/r_p r_r \tag{12}$$

and substituting equations (11) and (12) into equation (10)

$$M_{fj} = K\Omega \tag{13}$$

Thus, as set forth above, in the steady state operating condition, the angular rotation of the major trunion 20 is proportional in speed to the mass flow rate of fluid passing through the gyroscopic apparatus 10.

It has been found that the illustrated embodiments will provide linear response curves over various flow rates, generally as indicated by the foregoing basic response equation.

Each of the gyro assemblies should be balanced both dynamically and statically.

It will be apparent, particularly to those skilled in the art, that gyroscopic apparatus and assemblies as disclosed herein may be embodied in a wide variety of mass rate flow meter designs. The unit may be entirely self-contained and is operable to provide a local or remote read-out of the metered flow. Accurate measurements may be obtained without necessitating complex and expensive correction equipment, special totalization equipment, or external power sources. Operational energy is derived from the flowing fluid. Further, the gyroscopic apparatus may be of a simple design, and one which is economical to fabricate as well as being reliable, sturdy and accurate in use.

It will be seen that improvements have been provided in mass rate flow meters which meet the objects of this invention.

While particular embodiments of this invention have been shown, it will be understood, of course, that the invention is not limited thereto since modifications may be made by those skilled in the art, particularly in light of the foregoing teachings. Therefore, it is contemplated by the appended claims to cover any such modifications as incorporate those features which may be said to constitute the essential features of these improvements within the true spirit and scope of the invention.

What is claimed is:
1. Apparatus for measuring the mass flow of a fluid in a flow stream comprising:
 a gyroscope having an impeller rotor;
 means for directing a portion of said flow stream against said impeller to spin said impeller at an angular velocity proportional to the velocity of said flow stream;

means for deriving a force proportional to the momentum of fluid in said flow stream and applying such force as a precessional force on said gyroscope; and means for sensing the resulting precessional movement of said gyroscope.

2. Apparatus as in claim 1 wherein said impeller rotor includes peripheral vanes, and said vanes being formed with a centrally-disposed circumferentially-extending groove.

3. Apparatus as in claim 1 wherein said gyroscope is disposed with a conduit.

4. Apparatus as in claim 3 wherein said force deriving means includes a flow deflection device disposed asymmetrically of said rotor for deriving such precessional force by deflection of a portion of such flowing liquid.

5. Apparatus as in claim 4 wherein said last-mentioned means is a deflection plate.

6. Apparatus as in claim 4 wherein said last-mentioned means is a flow diverting tube.

7. Apparatus as in claim 6 wherein the diversion portion of said tube is spaced from the axis of rotation of said rotor.

8. Apparatuas as in claim 7 including a pair of oppositely-directed diversion vanes normally in registry with the outlet of said diverting tube, said diversion vanes being mounted such that as said rotor is tilted out of its normal plane of rotation the relative registry of said outlet with said vanes is altered to generate a corrective precessional force on said rotor.

9. A method for measuring the mass flow of a fluid flowing in a stream comprising:

impinging a portion of such flow stream on the rotor of a gyroscope to spin said rotor at an angular velocity proportional to the velocity of said flow stream;

deflecting a portion of said flow stream;

applying the force generated by such deflection to said gyroscope as a precessional force; and sensing the resulting precessional movement of said gyroscope.

10. Apparatus for measuring the mass flow of fluids comprising:

a housing having inlet and outlet ports and defining a flow path for communication of fluid flowing therethrough between said ports;

a gyroscope mounted within said flow path for movements about at least two mutually-perpendicular support axes, said gyroscope including a rotor mounted for movements about a mutually-orthogonal spin axis;

first means responsive to said fluid flowing through said housing for imparting rotary motion to said rotor of said gyroscope about said spin axis in proportion to the velocity of said fluids;

second means responsive to said fluid flowing through said housing for applying a torque about one of said perpendicular support axes of said gyroscope in proportion to the momentum of said fluid; and third means for sensing precessional movement of said gyroscope about the other of said perpendicular support axes of said gyroscope.

11. The apparatus of claim 10 wherein said gyroscope is mounted for unidirectional precessional rotation about said other of said perpendicular support axes.

12. The apparatus of claim 11 wherein said housing defines an annular orifice in said flow path, said rotor has a body presented to said annular orifice and said first means comprises vanes disposed about the circumference of said sphere, such that fluid exiting said annular orifice impinges upon said vanes at all degrees of precessional rotation of said gyroscope.

13. The apparatus of claim 12 wherein said second means comprises a pressure pad asymmetrically mounted with respect to said one of said perpendicular support axes of said gyroscope, such that fluid exiting said annular orifice impinges upon said pressure pad at all degrees of precessional rotation of said gyroscope.

14. The apparatus of claim 11 wherein said rotor body is spherical.

15. The apparatus of claim 10 further comprising fourth means for sequentially reversing the direction in which said second means applies torque about said one of said perpendicular support axes and said gyroscope being mounted for oscillating precessional rotation about said other of said perpendicular support axes.

16. The apparatus of claim 15 wherein said housing defines an arcuate port in said flow path, said rotor has a disc-shaped body presented to said arcuate port and said first means comprises vanes disposed about the circumference of said disc, such that the fluid exiting said arcuate port impinges upon said vanes over the entire breadth of oscillatory precessional rotation of said gyroscope.

17. The apparatus of claim 16 wherein said second means comprises a pressure pad symmetrically mounted with respect to said one of said perpendicular support axes of said gyroscope and at least two jets asymmetrically and oppositely mounted with respect to said one of said perpendicular support axes, and said fourth means sequentially causes fluid to flow through said jets to impinge upon said pressure pad in an alternating asymmetrical manner with respect to said one of said perpendicular support axes of said gyroscope.

* * * * *

UNITED STATES PATENT AND TRADEMARK OFFICE
CERTIFICATE OF CORRECTION

PATENT NO. : 4,241,613

DATED : December 30, 1980

INVENTOR(S) : Allen C. Bradham, III

It is certified that error appears in the above-identified patent and that said Letters Patent are hereby corrected as shown below:

Abstract, line 5, "and" should read -- an --. Column 6, line 51, "100" should read -- 110 --. Column 6, line 53, "100" should read -- 110 --. Column 6, line 54, "exists" should read -- exits --. Column 8, line 41, "arrangements" should read -- arrangement --. Column 15, line 14 (claim 3) "with" should read -- within --. Column 15, line 27 (claim 8) "Apparatuas" should read -- apparatus --.

Signed and Sealed this

Ninth Day of June 1981

[SEAL]

Attest:

RENE D. TEGTMEYER

*Attesting Officer*    *Acting Commissioner of Patents and Trademarks*